No. 695,541. Patented Mar. 18, 1902.
L. CRÉANCHE.
DRIVING MECHANISM FOR MOTOR VEHICLES.
(Application filed July 15, 1899.)

(No Model.)

Witnesses
Inventor
Louis Créanche
Wm E. Boulter
Attorney

UNITED STATES PATENT OFFICE.

LOUIS CRÉANCHE, OF PARIS, FRANCE.

DRIVING MECHANISM FOR MOTOR-VEHICLES.

SPECIFICATION forming part of Letters Patent No. 695,541, dated March 18, 1902.

Application filed July 15, 1899. Serial No. 723,983. (No model.)

*To all whom it may concern:*

Be it known that I, LOUIS CRÉANCHE, a citizen of the Republic of France, residing at Paris, France, have invented certain new and useful Improvements in or Relating to Driving Mechanism for Motor-Vehicles, of which the following is a specification.

The present invention relates to driving mechanism for motor-vehicles, whereby the connection between the driving part and the driven part can be interrupted for the purpose of effecting a change of speed.

To render the nature of my invention clear, I have illustrated in the accompanying drawings, by way of example, a four-wheeled motor-vehicle with the mechanism applied.

Figure 1:
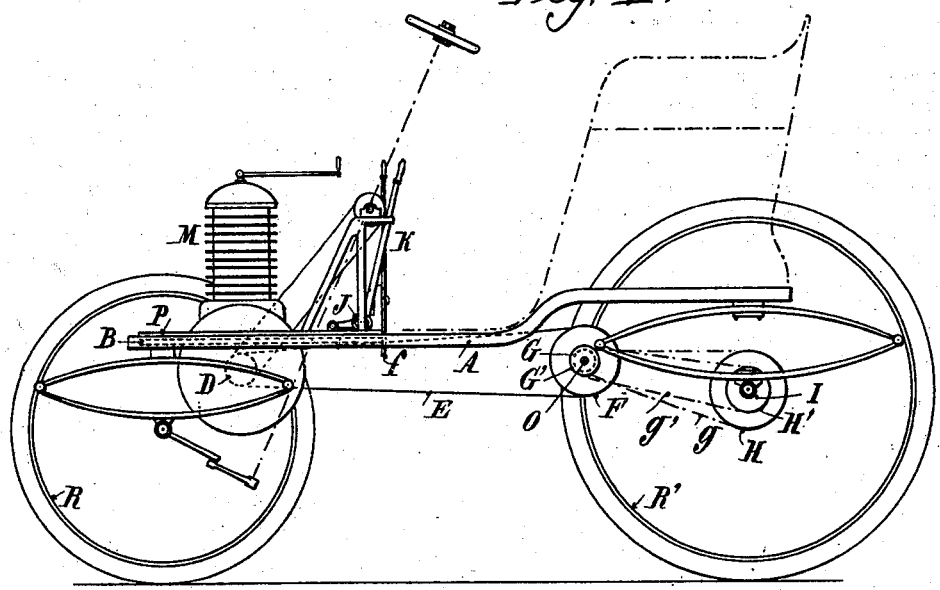
Figure 2:
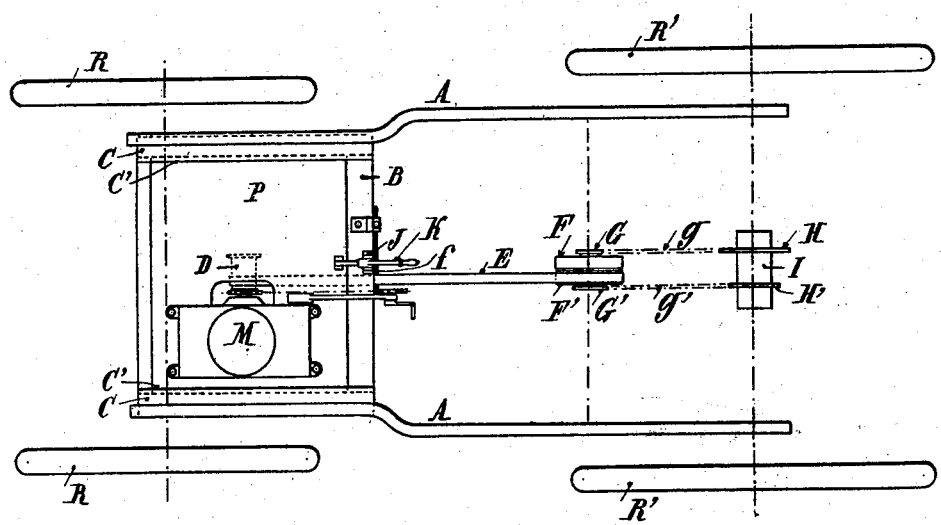

Figure 1 is a schematic view in side elevation, and Fig. 2 a plan view of Fig. 1 with the body of the vehicle removed.

It will be seen that the frame A of the vehicle carries above the axle of the front wheels R a frame B, which can be secured on a vehicle of any description by any convenient means. On this frame B is placed a platform so arranged as to be able to slide in the direction of the length of the carriage. For this purpose the frame B is provided on each side of the platform P with grooves, in which slide the side edges of the platform. The platform carries a motor M, which may be of any description, as well as all the accessory and necessary parts for the motor—such as the carbureter, reservoir, exhaust-chamber, &c.—if an oil-engine is employed.

A pulley D, receiving its motion from the motor M, transmits this motion, by means of a belt E, either to a pulley F or to a pulley F', (of the same diameter,) according to whether the belt is placed on the one or the other. The pulley D is of sufficient width to allow for the lateral displacement of the belt E, such displacement being effected in the ordinary manner by means of a forked lever or belt-shifter $f$.

The pulleys F and F' are mounted loosely on an intermediate axle O.

The pulley F carries on the outer side as regards the belt E an axial circular projection or disk G, the circumference of which is provided with teeth for the purpose of receiving a transmission-chain $g$. The pulley F' is fitted in the same manner, the disk G' being of different diameter as compared with G and receiving a transmission-chain $g'$. The chain $g$ transmits its movement to a pinion H, keyed on a differential gearing I on the axle of the driving-wheels R', and the chain $g'$ transmits its movement onto another pinion H', of a different diameter to that of the pinion H, and, like the latter, also connected to the differential gearing I.

It should be observed that I do not limit myself to two speeds, as I can increase the number of different speeds by providing more than the two pulleys F F' and chains $g\ g'$, the motor-pulley being sufficiently wide to allow for the necessary lateral movement of the belt.

The working of the speed-change device will now be easily understood.

Whenever, say, by means of an eccentric J, actuated by a lever K, or by any other device capable of producing the same effect, the platform is moved relatively to the frame B, so as to move nearer to the intermediate axle O, the belt will be slackened and will no longer transmit the motion from the motor to the driving-wheels R', and hence the car will gradually come to a stop. In case a change of speed is desired such slackening of the belt E will greatly facilitate the shifting of the belt from one of the pulleys F or F' to the other, according to the rate of speed which it is desired to obtain. This arrangement, according to which the motor is displaced relatively as regards the driven part, which remain stationary, and the employment of a belt makes it possible to support intermediate devices, such as toothed wheels, the gearing and ungearing of which are always accompanied with difficulties and shocks. Suitable brake devices can be employed to operate when the platform is moved or independently of said movement.

I claim—

1. In a motor-vehicle, the combination with the frame, of a support movable upon the frame lengthwise of the vehicle, a motor carried by the said support, driving mechanism comprising pulleys arranged side by side and independently rotatable, an intermediate axle, a transmission-belt intermediate the motor and the pulleys, differential gearing intermediate the driving-wheels and the pulleys, means for shifting the belt from one pulley to the other, an operating-lever and a connection between the same and the motor-support.

2. In a motor-vehicle, the combination with the frame, of a support movable upon the frame lengthwise of the vehicle, a motor carried by the said support, guides on the frame for said support, whereby the latter may be moved longitudinally to slacken or tighten the transmission-belt driving mechanism comprising pulleys arranged side by side and independently rotatable, a transmission-belt intermediate the motor and the pulleys, toothed disks of different diameters carried by the pulleys, means for shifting the belt from one pulley to the other, an operating-lever, a connection between the same and the motor-support, pinions of different diameters geared to the toothed disks, and gearing between the pinions and the driving-wheel shaft of the vehicle.

3. In a motor-vehicle, a motor carried on a movable support, connected by a belt E to intermediate pulleys F F', provided with disks G G' respectively, chains $g$ $g'$, and pinions H H' on the rear axle a lever and eccentric for moving said support longitudinally to slacken or tighten said belt, substantially as described.

In testimony whereof I have hereto set my hand in the presence of the two subscribing witnesses.

LOUIS CRÉANCHE.

Witnesses:
   JEAN ROBELET,
   I. ALLEN BOURY.